(12) United States Patent
Wang et al.

(10) Patent No.: US 9,289,702 B2
(45) Date of Patent: *Mar. 22, 2016

(54) METHOD OF MAKING A FILTER MEDIA WITH AN ENRICHED BINDER

(71) Applicant: KX Technologies LLC, West Haven, CT (US)

(72) Inventors: Jinwen Wang, Milford, CT (US); Meedia A. Kareem, Bridgeport, CT (US); Andrew W. Lombardo, West Haven, CT (US); Frank A. Brigano, Northford, CT (US); Richard D. Kendrick, Stratford, CT (US)

(73) Assignee: KX TECHNOLOGIES, LLC, West Haven, CT (US)

( * ) Notice: Subject to any disclaimer, the term of this patent is extended or adjusted under 35 U.S.C. 154(b) by 71 days.

This patent is subject to a terminal disclaimer.

(21) Appl. No.: 14/090,142

(22) Filed: Nov. 26, 2013

(65) Prior Publication Data

US 2014/0084518 A1    Mar. 27, 2014

Related U.S. Application Data

(63) Continuation of application No. 12/713,869, filed on Feb. 26, 2010, now Pat. No. 8,622,224.

(51) Int. Cl.
*B01D 27/02* (2006.01)
*B01D 27/04* (2006.01)
(Continued)

(52) U.S. Cl.
CPC ............ *B01D 24/001* (2013.01); *B01D 27/005* (2013.01); *B01J 20/3042* (2013.01);
(Continued)

(58) Field of Classification Search
CPC .... B01D 24/001; B01D 27/005; B01D 27/02; B01D 27/04; B01D 2101/02; B01D 2101/005; B01D 2239/086; B01D 2239/08; B01D 2239/0407; B01J 20/3042; B01J 20/223; B01J 20/0233; B01J 20/32; B01J 20/3242; B01J 20/3206; B01J 20/3202; C04B 14/022; C04B 14/02

See application file for complete search history.

(56) References Cited

U.S. PATENT DOCUMENTS

| 3,872,013 A | 3/1975 | Nishino et al. |
| 4,564,456 A | 1/1986 | Homan |

(Continued)

FOREIGN PATENT DOCUMENTS

| JP | 11-507997 | 1/1997 |
| WO | WO 97 23594 | 7/1997 |

(Continued)

OTHER PUBLICATIONS

Sasson et al. Bromide-chloride exchange between alkyl halides and metal halide salts under phase transfer conditions. J. Chem. Soc., Chem. Commun. (1986) 1250-1252.

*Primary Examiner* — Katherine Zalasky
(74) *Attorney, Agent, or Firm* — DeLio, Peterson & Curcio, LLC; Kelly M. Nowak

(57) ABSTRACT

Water filtration media having a charged material affixed directly to binder material used in the fabrication of the filter media. A microbiological interception enhancing agent is added to the binder directly. The media having a charged material and a microbiological interception enhancing agent both affixed directly on or in a binder material is then combined with core filter media and prepared as a filtration media. A filter is prepared from the treated filter media.

15 Claims, 2 Drawing Sheets

(51) Int. Cl.
  *B01J 20/30* (2006.01)
  *B01J 20/32* (2006.01)
  *B01J 20/22* (2006.01)
  *B01D 24/00* (2006.01)
  *B01D 27/00* (2006.01)
  *C04B 26/02* (2006.01)
  *C04B 14/02* (2006.01)
  *C04B 111/00* (2006.01)

(52) U.S. Cl.
  CPC ........ *C04B 26/02* (2013.01); *B01D 2239/0407* (2013.01); *B01D 2239/0442* (2013.01); *B01D 2239/086* (2013.01); *B01J 20/3206* (2013.01); *B01J 20/3242* (2013.01); *C04B 2111/00129* (2013.01); *C04B 2111/00793* (2013.01)

(56) References Cited

U.S. PATENT DOCUMENTS

| | | | |
|---|---|---|---|
| 4,796,874 | A | 1/1989 | Hoying et al. |
| 5,868,933 | A | 2/1999 | Patrick et al. |
| 5,954,962 | A | 9/1999 | Adiletta |
| 6,630,016 | B2 | 10/2003 | Koslow |
| 6,715,618 | B2 | 4/2004 | Siau |
| 6,835,311 | B2 | 12/2004 | Koslow |
| 6,953,604 | B2 | 10/2005 | Koslow |
| 6,959,820 | B2 | 11/2005 | Koslow |
| 6,998,058 | B2 | 2/2006 | Koslow |
| 7,008,537 | B2 | 3/2006 | Koslow |
| 7,011,753 | B2 | 3/2006 | Koslow |
| 7,144,533 | B2 | 12/2006 | Koslow |
| 7,276,166 | B2 | 10/2007 | Koslow |
| 7,296,691 | B2 | 11/2007 | Koslow |
| 7,357,868 | B2 | 4/2008 | Levy |
| 7,614,507 | B2 | 11/2009 | Mitchell et al. |
| 2005/0242041 | A1 | 11/2005 | Cumberland |
| 2007/0062862 | A1 | 3/2007 | Hughes et al. |
| 2007/0199890 | A1 | 8/2007 | Trogolo |

FOREIGN PATENT DOCUMENTS

| | | |
|---|---|---|
| WO | WO 01 07090 | 2/2001 |
| WO | WO 02 070104 | 9/2002 |
| WO | WO 03 106603 | 12/2003 |
| WO | WO 2009 070581 | 6/2009 |
| WO | WO2009085553 | 7/2009 |

METHOD OF MAKING A FILTER MEDIA WITH AN ENRICHED BINDER

BACKGROUND OF THE INVENTION

1. Field of the Invention

The present invention relates to a water filtration media having a charged material affixed directly to binder material used in the fabrication of the filter media. A microbiological interception enhancing agent may also be added to the binder directly. In one embodiment, the present invention relates to a method of making a filter media having a charged material and a microbiological interception enhancing agent both affixed directly on a binder material. The resultant enriched binder is then combined with core filter media and prepared as a filtration media.

2. Description of Related Art

Generally, carbon or activated carbon fibers or structures that form the core filter media in a filtration system may be chemically treated with charged material and/or any compatible microbiological interception enhancing agent, with or without a biologically active metal. A binder or thermoplastic material in powder, particulate, or fiber form, is then combined to provide enhanced strength. In some instances, the activated carbon/binder combination is chemically treated with charged material and compatible microbiological interception enhancing agents.

The prior art does not teach combining charged material directly to the binder, or combining a microbiological interception capability directly to the binder, with or without the addition of charged material.

Microbiological interception enhancing agents that comprise a cationic silver complex are known in the art. Generally these agents are deposited on either carbon block or fiber filters for water purification and demonstrate excellent viral and bacterial interception. The method for depositing the agent in these applications has been known to be rather complicated. A cationic silver complex (charged material) is generally formed directly on activated carbon in a two step treatment process. The activated carbon is treated by cationic material and then reacted with silver ammonia complex to form a cationic silver-amine-halide complex. This process has been taught in part by the following U.S. Pat. Nos. 6,630,016; 6,835,311; 6,953,604; 6,959,820; 6,998,058; 7,008,537; 7,011,753; and 7,144,533, which were issued to Koslow, and assigned to KX Technologies LLC.

A silver ammonia complex is prepared by reacting a silver nitrate solution with sodium chloride to precipitate silver chloride. The silver chloride is washed thoroughly to remove completely nitrate ions. The concentration of nitrate ions is monitored during the rinse. A large amount of ammonia solution is then used to dissolve the silver chloride to form a silver ammonia complex solution. The activated carbon is then treated and dried at approximately 300° F. for a period of time, typically overnight.

The present invention deviates from this known process insomuch as the charged material or the microbiological interception enhancing agents, or both, are added directly to the binder material that provides the structural integrity for the activated carbon.

SUMMARY OF THE INVENTION

Bearing in mind the problems and deficiencies of the prior art, it is therefore an object of the present invention to provide a more efficient chemistry for microbiological interception within a filter media.

It is another object of the present invention to provide method of combining charged material directly to binder material prior to combining the binder material with the core filter media material in a filter media fabrication process.

It is another object of the present invention to provide a method of combining microbiological interception enhancing agents directly to binder material in a filter media fabrication process.

It is yet another object of the present invention to simplify the process of incorporating microbiological interception enhancing agents within the core filter media, as well as simplifying the chemistry of the process, by adding the microbiological interception enhancing agent directly to the binder material or to binder material having charged material attached thereto, and by decreasing the amount of sodium bromide and charged material that would have otherwise been combined directly within the filter core media itself, and further eliminating the use of sodium chloride and ammonia.

It is another object of the present invention to enhance the microbiological interception of carbon block filters over the prior art by adding charged material to the binder material and combining the charged material with microbiological interception enhancing agents on the binder, so as to no longer reduce the available surface area on the activated carbon.

A further object of the invention is to provide a method for incorporating microbiological interception to carbon filters which accommodates a greater variety of activated carbon mesh sizes.

It is yet another object of the present invention to provide a method of using a binder material to control the distribution of charged material and microbiological interception enhancing agents within a carbon block filter media.

Still other objects and advantages of the invention will in part be obvious and will in part be apparent from the specification.

The above and other objects, which will be apparent to those skilled in the art, are achieved in the present invention which, in a first aspect, is directed to a method of making a filter media having a microbiological interception capability, comprising: combining a charged material directly to a binder material, forming a charged binder material; combining a core filter media with the charged binder material; and forming a filter media with the combined core filter media and the charged binder material. The step of forming the filter media may include extruding or compression molding the combined core filter media and charged binder into a solid composite or block. The charged material may include: a colloid; a small charged molecule; or a linear or branched polymer having positively charged atoms along the length of the polymer chain having a counter ion associated therewith. More specifically, the charged material may include a solution of sodium bromide and a homopolymer of diallyl dimethyl ammonium chloride or poly-DADMAC.

In a second aspect, the present invention is directed to a method of making a filter media having a microbiological interception capability, comprising: combining a charged material, a microbiological interception enhancing agent, and a binder material to form an enriched binder; and combining a core filter media with the enriched binder; and forming the filter media with the core filter media and the enriched binder. The microbiological interception enhancing agent may comprise a biologically active metal salt solution including biologically active metals. Silver bromide may be added directly to the charged binder.

In a third aspect, the present invention is directed to a method of making a filter media having a microbiological interception capability, comprising: combining a binder material with polyacrylic acid (PAA), the PAA in 35% aqueous solution in an amount approximately 0.1% to 10% by weight of the binder material to form a binder-PAA combination; diluting the binder-PAA combination in deionized water in an amount at 18% to 72% by weight of the binder material; drying the binder-PAA combination, and crushing into a powder; mixing approximately 1% to 5% of the charged material as a percentage of the binder material weight with AgBr at an amount approximately 0.05% to 0.5% by weight of the core filter media; mixing deionized water with the charged material and the AgBr at an amount 18% to 54% by weight of the binder-PAA combination to form a charged material-AgBr solution; combining the charged material-AgBr solution with the binder-PAA combination and drying resultant combination to form an enriched binder; combining a core filter media with the enriched binder; and forming the filter media with the core filter media and the enriched binder.

In a fourth aspect, the present invention is directed to a method of making a filter media having a microbiological interception capability, comprising: combining a charged material, a microbiological interception enhancing agent, and a binder material to form an enriched binder, including: combining the binder material with polyacrylic acid (PAA), the PAA in 35% aqueous solution in an amount approximately 0.1% to 10% by weight of the binder material; diluting the PAA and binder material combination in deionized water in an amount at 18% to 72% by weight of the binder material to form a binder-PAA combination; combining the charged material in an amount approximately 1% to 5% by weight of binder material, and AgBr in an amount approximately 0.05% to 0.5% by weight of the core filter media; mixing the charged material, the AgBr, and the binder-PAA combination into deionized water at an amount 18% to 54% by weight of the binder-PAA combination; drying the resultant charged material, AgBr, binder-PAA combination; combining a core filter media with the enriched binder; and forming the filter media with the core filter media and the enriched binder.

In a fifth aspect, the present invention is directed to a charged binder comprising: binder material in powder, particulate, or fiber form, in combination with a charged material including: a colloid; a small charged molecule; or a linear or branched polymer having positively charged atoms along the length of the polymer chain having a counter ion associated therewith.

In a sixth aspect, the present invention is directed to an intermediate filter media composition having microbiological interception capability, comprising: a charged binder including a charged material affixed directly to a binder material before being combined with a core filter media and before the application of heat; and the core filter media combined with the charged binder material. The intermediate filter media may include having the charged binder enriched by combining at least one microbiological interception enhancing agent to the charged binder before being combined with the core filter media and before the application of heat.

In a seventh aspect, the present invention is directed to a filter having microbiological interception capability, comprising: a filter media having a core filter media and a charged binder, wherein the charged binder includes binder material with charged material affixed directly thereto before combining with the core filter media, and wherein the filter media has the charged binder dispersed throughout the core filter media after the application of heat; a housing enclosing the filter media; and end caps for sealing the filter media within the housing. The filter may include having the charged binder enriched by combining at least one microbiological interception enhancing agent to the charged binder before being combined with the core filter media and before the application of heat.

The filter may also include having the filter media formed into a composite block structure, a spiral-wound sheet, or a pleated sheet.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

In describing the preferred embodiment of the present invention, reference will be made herein to FIGS. 1-4 of the drawings in which like numerals refer to like features of the invention.

In a method for making filter media of at least one embodiment of the present invention, a core filter media material is combined with a binder material that has been previously treated with a charged material. In one embodiment, a core filter media is combined with a binder material that has been previously treated with a charged material and a microbiological interception enhancing agent.

The filter media generally incorporates a microporous structure that provides microbiological interception capability using an appropriate pore structure, charge material, chemical treatment, or a combination thereof. The microporous structure comprises an array of active particles that have a specific pore structure, as well as adsorbent and/or absorbent properties. The array can be a solid composite block, a monolith, a ceramic candle, or a flat-sheet composite of bonded or immobilized particles formed into a coherent medium, all of which may use a binder or supporting bonding material. These particle arrays may be made through processes known in the art such as, for example, extrusion, molding, or slip casting. For desirable results, the microporous material is capable of having a mean flow path on the order of 2 microns, although having a particular mean flow path is not a condition precedent for practicing the present invention.

In the previously identified cited prior art of Koslow, incorporated herein by reference, the chemical treatment process used to treat the surface of the core filter media utilized a synergistic interaction between a charged or cationic material and a microbiological interception enhancing agent, such as a biologically active metal, that when combined with the core filter media provided broad-spectrum reduction of microbiological contaminants on contact. The charge provided by the cationic material combined with the core filter media aids in electro-kinetic interception of microbiological contaminants, while the tight pore structure provides a short diffusion path and, therefore, rapid diffusion kinetics of microbiological contaminants in a flowing fluid to a surface of the microporous structure.

Figure 1:
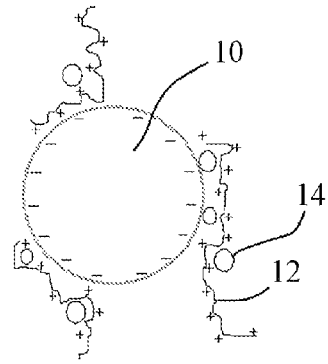
FIG. 1 is an illustration of a binder material coated with charged material and a microbiological interception enhancing agent before the binder is added to the core filter media and heated.

For the implementation of at least one embodiment of the present invention, the core filter media is combined with binder material that has previously been combined with charged material, microbiological interception enhancing agents, or both, ultimately to form the complete filter media for use in a filtration system. FIG. 1 depicts a binder 10 coated with a charged material 12 and a microbiological interception enhancing agent 14. These ingredients may be of multiple types, and are identified below. It should be noted that, although not listed, materials related to the families of the materials identified may also be employed with the present invention, and the lists provided are not intended to be inclusive of all such material, but rather a representative sample of those materials and family of materials that satisfy the working of the present invention.

The microporous filter medium having a binder directly treated with charged material with or without microbiological interception enhancing agents may be used as a composite block, a flat sheet, a pleated medium, or as a spiral wound medium depending upon the application and the filter housing design. It may be used for almost any type of filtration including water and air for industrial, commercial, and domestic applications.

Core Filter Media

The core filter media utilized may comprise an array of adsorbent and/or absorbent active particles. The active material may be in particulate, powder, or granular form, using wet-laid or dry-laid media processes, and may include, but is not limited to, activated carbon, activated alumina, zeolites, diatomaceous earth, silicates, aluminosilicates, titanates, bone char, calcium hydroxyapatite, manganese oxides, iron oxides, magnesia, perlite, talc, polymeric particulates, clay, iodated resins, ion exchange resins, ceramics, super absorbent polymers (SAPs), and combinations thereof. This activated material may be converted into a solid composite by extrusion, compression molding, or other processes known to one of skill in the art. Exemplary processes are described in U.S. Pat. Nos. 5,019,311, and 5,189,092.

Fibers may also be used as the core filter media. These fibers may comprise organic polymeric fibers that are capable of being fibrillated. Fibrillated fibers are generally advantageous due to their exceptionally fine dimensions and potentially low cost. Such fibrillated fibers include, but are not limited to, polymers such as polyamide, acrylic, acrylonitrile; liquid crystal polymers such as VECTRAN® from Kuraray Co., Ltd., of Japan, and ZYLON® from Toyo Boseki Kabushiki Kaisha Corporation of Japan, and the like, ion-exchange resins, engineered resins, cellulose, rayon, ramie, wool, silk, glass, metal, ceramic, other fibrous materials, or combinations thereof, or a combination of fibers with particulate media such as, but not limited to, activated carbon, activated alumina, zeolites, diatomaceous earth, silicates, aluminosilicates, titanates, bone char, calcium hydroxyapatite, manganese oxides, iron oxides, magnesia, perlite, talc, polymeric particulates, clay, iodated resins, ion exchange resins, ceramics, super absorbent polymers (SAPs), and combinations thereof. Combinations of organic and inorganic fibers and/or whiskers, whether fibrillated or not, are contemplated and within the scope of the invention. For example, glass, ceramic, metal fibers, or polymeric fibers may be used separately or together. In one embodiment, fibrillated lyocell fibers, such as LYOCELL BY LENZING® from Lenzing Aktiengesellschaft Corporation of Austria, are employed due to their exceptionally fine dimensions and potentially low cost.

The core filter media may also be in the form of a flat sheet media, potentially made from fibers, or combinations of fibers and particulate media, which may ultimately be rolled, layered, and/or pleated for enhanced filtering applications.

Binder Material

It is well known in the art that the addition of thermoplastic or thermoset materials in powder, particulate, or fiber form, will assist in binding the active particles of the core filter media. This binder material may include any of following types: polyolefins, polyvinyl halides, polyvinyl esters, polyvinyl ethers, polyvinyl alcohols, polyvinyl sulfates, polyvinyl phosphates, polyvinyl amines, polyamides, polyimides, polyoxidiazoles, polytriazols, polycarbodiimides, polysulfones, polycarbonates, polyethers, polyarylene oxides, polyesters, polyarylates, phenol-formaldehyde resins, melamine-formaldehyde resins, formaldehyde-ureas, ethyl-vinyl acetate copolymers, co-polymers and block interpolymers thereof, and combinations thereof. Variations of the above materials and other useful polymers include the substitution of groups such as hydroxyl, halogen, lower alkyl groups, lower alkoxy groups, monocyclic aryl groups, and the like. Other potentially applicable materials include polymers such as polystyrenes and acrylonitrile-styrene copolymers, styrene-butadiene copolymers, and other non-crystalline or amorphous polymers and structures.

A more detailed list of binder materials that may be useful include end-capped polyacetals, such as poly(oxymethylene) or polyformaldehyde, poly(trichloroacetaldehyde), poly(n-valeraldehyde), poly(acetaldehyde), and poly(propionaldehyde); acrylic polymers, such as polyacrylamide, poly(acrylic acid), poly(methacrylic acid), poly(ethyl acrylate), and poly(methyl methacrylate); fluorocarbon polymers, such as poly(tetrafluoroethylene), perfluorinated ethylene-propylene copolymers, ethylene-tetrafluoroethylene copolymers, poly(chlorotrifluoroethylene), ethylene-chlorotrifluoroethylene copolymers, poly(vinylidene fluoride), and poly(vinyl fluoride); polyamides, such as poly(6-aminocaproic acid) or poly(e-caprolactam), poly(hexamethylene adipamide), poly(hexamethylene sebacamide), and poly(11-aminoundecanoic acid); polyaramides, such as poly(imino-1,3-phenyleneiminoisophthaloyl) or poly(m-phenylene isophthalamide); parylenes, such as poly-2-xylylene, and poly(chloro-1-xylylene); polyaryl ethers, such as poly(oxy-2,6-dimethyl-1,4-phenylene) or poly(p-phenylene oxide); polyaryl sulfones, such as poly(oxy-1,4-phenylenesulfonyl-1,4-phenyleneoxy-1,4-phenyl-eneisopropylidene-1,4-phenylene), and poly(sulfonyl-1,4-phenylene-oxy-1,4-phenylenesulfonyl-4,4'-biphenylene); polycarbonates, such as poly-(bisphenol A) or poly(carbonyldioxy-1,4-phenyleneisopropylidene-1,4-phenylene); polyesters, such as poly(ethylene terephthalate), poly(tetramethylene terephthalate), and poly(cyclohexylene-1,4-dimethylene terephthalate) or poly(oxymethylene-1,4-cyclohexylenemethyleneoxyterephthaloyl); polyaryl sulfides, such as poly(p-phenylene sulfide) or poly(thio-1,4-phenylene); polyimides, such as poly(pyromellitimido-1,4-phenylene); polyolefins, such as polyethylene, polypropylene, poly(1-butene), poly(2-butene), poly(1-pentene), poly(2-pentene), poly(3-methyl-1-pentene), and poly (4-methyl-1-pentene); vinyl polymers, such as poly(vinyl acetate), poly(vinylidene chloride), and poly(vinyl chloride); diene polymers, such as 1,2-poly-1,3-butadiene, 1,4-poly-1, 3-butadiene, polyisoprene, and polychloroprene; polystyrenes; and copolymers of the foregoing, such as acrylonitrilebutadiene-styrene (ABS) copolymers.

Polyolefin based materials are advantageous. For example, certain types of treated polyethylene or polyester fibers, when properly treated, are optimal, and have the additional benefit of not significantly interfering with the hydrophilic nature of the resulting filter media when used in modest volumes.

Polyolefin powders, such as MICROTHENE® F of Equistar Chemicals, LP of Houston, Tex., and the like, may be successfully employed. These powders comprise ultra-fine, spherically shaped particles with narrow size distribution suitable for use in a broad range of specialty applications. Polyolefin powders combine the unique properties of a polyolefin resin with a microfine particle size. Polyolefin powders are typically added to certain thermoplastic and thermosetting resins to improve surface appearance, dimensional stability, extrudability, or shrinkage characteristics. Generally, by adding one percent to six percent by weight polyolefin powder, resin filler distribution, mold flow, and moisture resistance, are improved while strength properties are successfully retained.

The binder material may be present in a carbon block filter media in an amount of about 10% to 40% by weight, more specifically about 15% to 25%, and most specifically about 18%. For a binder material present in flat sheet media, a potential amount is 5% to 30% by weight, and more specifically 8% to 15%, and most specifically 10%. It is desirable for the binder material to have a softening point that is significantly lower than a softening point of the core filter media so that the core filter media/binder combination can be heated to activate the binder material, while the microporous structure does not melt and thereby lose porosity.

Charged or Cationic Material for Enriching a Binder

Charged molecules useful for this application may be small molecules with a single charged unit and capable of being attached to the binder, and after heat processing, to at least a portion of the microporous structure. The cationic material may have one or more counter ions associated therewith which, when exposed to a biologically active metal salt solution, cause preferential precipitation of the metal in proximity to the cationic surface to form a cationic metal precipitate.

The charged or cationic material may be a colloid, a small charged molecule, or a linear or branched polymer having positively charged atoms along the length of the polymer chain having a counter ion associated therewith.

If the cationic material is a polymer, the charge density may be greater than about 1 charged atom per about every 20 Angstroms, specifically greater than about 1 charged atom per about every 12 Angstroms, and more specifically greater than about 1 charged atom per about every 10 Angstroms of molecular length. The higher the charge density on the cationic material, the higher the concentration of the counter ion associated therewith. A high concentration of an appropriate counter ion can be used to drive the precipitation of a cationic metal complex. The cationic material consistently provides a highly positively charged surface to the microporous structure as determined by a streaming or zeta potential analyzer, whether in a high or low pH environment. Zeta or streaming potentials of the microporous structure after treatment with a high molecular weight charged polymer are generally greater than about +10 millivolts, and often up to about +23 millivolts at a substantially neutral pH.

The cationic material generally suitable for use includes, but is not limited to, quaternized amines, quaternized amides, quaternary ammonium salts, quaternized imides, benzalkonium compounds, biguanides, cationic aminosilicon compounds, cationic cellulose derivatives, cationic starches, quaternized polyglycol amine condensates, quaternized collagen polypeptides, cationic chitin derivatives, cationic guar gum, colloids such as cationic melamine-formaldehyde acid colloids, inorganic treated silica colloids, polyamide-epichlorohydrin resin, cationic acrylamides, polymers and copolymers thereof, combinations thereof, and the like.

Exemplary amines may be pyrroles, epichlorohydrin derived amines, polymers thereof, and the like. Exemplary amides may be those polyamides disclosed by Hou, et al., in "Microorganism Filter and Method for Removing Microorganism from Water" (International Patent Application No. WO 01/07090), and the like. Exemplary of quaternary ammonium salts may be homopolymers of diallyl dimethyl ammonium halide, epichlorohydrin derived polyquaternary amine polymers, quaternary ammonium salts derived from diamines and dihalides, polyhexamethylenedimethylammonium bromide, and the like, such as those disclosed in U.S. Pat. Nos. 2,261,002; 2,271,378; 2,388,614; and 2,454,547, all of which are incorporated by reference, and in International Patent Application No. WO 97/23594, also incorporated by reference. The cationic material may be chemically bonded, adsorbed, or crosslinked to itself or to the fiber or membrane.

The cationic or charged material may include a solution of sodium bromide and a homopolymer of diallyl dimethyl ammonium chloride or poly-DADMAC (PDADMAC). PDADMAC is a high-molar-mass, cationic polymer, which can be used in fixation of anionic substances. It is a cationic polymer that can be completely dissolved in water. The polymer body contains a strong cationic group radical and an activated-adsorbent group radical which can destabilize and flocculate the suspended solids and the negative-charged water soluble matters in waste water through electro-neutralization and bridging adsorption. It is very effective in flocculating, decoloring, killing algae, and removing organics. It is adaptable to wide range of pH value, between 0.5 and 1.4. One PDADMAC for use may be MERQUAT® from the Naclo Company of Naperville, Ill.

Other materials suitable for use as the charged or cationic material include BIOSHIELD® available from BioShield Technologies, Inc., of Norcross, Ga. BIOSHIELD® is an organosilane product including approximately 5% by weight octadecylaminodimethyltrimethoxysilylpropyl ammonium chloride and less than 3% chloropropyltrimethoxysilane. Another material that may be used is SURFACINE® available from Surfacine Development Company LLC, of Tyngsboro, Mass. SURFACINE® comprises a three-dimensional polymeric network obtained by reacting poly(hexamethylenebiguanide) (PHMB) with 4,4'-methlyene-bis-N,N-diglycidylaniline (MBGDA), and a crosslinking agent, to covalently bond the PHMB to a polymeric surface. Silver, in the form of silver iodide, may be introduced into the network, and is trapped as submicron-sized particles. The combination is an effective biocide, which may be used. Depending upon the fiber and membrane material, the MBGDA may or may not crosslink the PHMB to the fiber or the membrane.

Microbiological Interception Enhancing Agents for Binder Enrichment

Pursuant to at least one embodiment of the present invention, the cationic material is affixed directly to the binder. The cationic material may further be exposed to a microbiological interception enhancing agent, such as a biologically active metal salt solution. For this purpose, the metals that are biologically active are well suited for this application. Such biologically active metals include, but are not limited to, silver, copper, zinc, cadmium, mercury, antimony, gold, aluminum, platinum, palladium, and combinations thereof. Specifically, silver and copper are desirable. The biologically active metal salt solution may be selected such that the metal and the counter ion of the cationic material are substantially insoluble in an aqueous environment to drive precipitation of the cationic metal complex.

As previously stated, a particularly useful charged material, microbiological interception enhancing agent combination is a cationic silver-amine-halide complex. The cationic amine may be a homopolymer of diallyl dimethyl ammonium halide having a molecular weight of about 400,000 Daltons, or other quaternary ammonium salts having a similar charge density and molecular weight. The chloride counter ion may be replaced with a bromide or iodide counter ion. In one embodiment, the process includes mixing the silver bromide and charged material, such as PDADMAC, directly instead of using silver nitrate and precipitating silver bromide.

When used in the context of a gravity-flow water filtration system, the microbiological interception enhanced filter media may be made with hydrophilic materials or treated with a wetting agent to provide good, spontaneous wettability. Alternatively, in other applications, the microbiological interception enhanced filter media may be treated to provide either a hydrophilic or hydrophobic characteristic as needed.

A Method of Charging the Binder Material

In a first embodiment, prior to combining with the core filter media, the binder material of the type identified above is combined with charged material of the type identified above, for example, cationic material from the polyolefin family. This embodiment may have an inert amount of core filter media in the binder-charged material combination; however, any inert amount of core filter media would be of an amount that has an insubstantial effect on the binder properties or charged material properties, and would be in an insufficient amount to form the filtration media. Methods of applying cationic material are known in the art and include, but are not limited to, spray, dip, or submergence coating to cause adsorption, chemical reaction, or crosslinking of the cationic material to the binder material. The resultant combination is then dried. Different types of drying processes known in the art may be employed. The method of drying may be sprayed drying; however, the drying process is not limited to any particular type of drying method. The drying process may be performed at a temperature range of approximately 150° F. to 160° F., although depending upon the drying process, other temperature ranges may be more suitable, and would be considered acceptable. The binder materials may also contain flow-enhancing agents for processing and handling.

The charged material is generally a molecule relatively long in length (on the scale of micrometers), such as those identified in the polyolefin family of charged materials. The cationic material/binder ratio may be kept below 0.5, and more specifically below 0.05. After heat processing, some segments of the cationic molecules are affixed directly to the binder by embedding in the melting binder and anchoring on the surface of the binder. In order to anchor the charged material to the binder more securely, poly acrylic acid (PAA) is introduced to form insoluble polyelectrolyte complexes with the cationic material. Implementation of this method provides for lower material and labor cost, enhanced performance of carbon blocks, and a safer working environment. The charged binder is then combined with the activated material of the core filter media.

In another embodiment, the resultant binder and charged material, as combined above, is further combined and enriched with a microbiological interception enhancing agent. It is also acceptable to combine the microbiological interception enhancing agent with the charged material first, and then combine the resultant enrichment to the binder. The fully enriched binder comprising a combination of binder material, charged material, and microbiological interception enhancing agent, is then combined with the active carbon particles of the core filter media.

Figure 2:
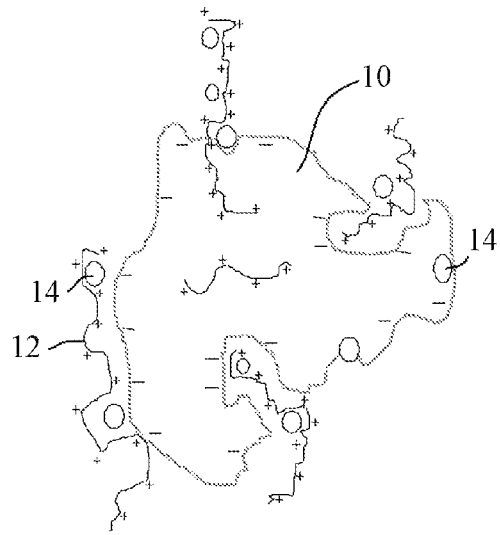
FIG. 2 is the binder of FIG. 1 after a melting process.

As an example, a microbiological interception enhancing agent of silver bromide is added directly to the resultant binder/charged material combination. In at least one embodiment of the present invention, the silver bromide that is added directly to the resultant charged binder material combination may be used in either wet or dried form. The enriched binder is then added to the active particle core filter media. Heat is then applied. FIG. 2 depicts binder 10 enriched with charged material 12 and a microbiological interception enhancing agent 14 after heat has been applied to the enriched combination. Before melting, charged material 12 and microbiological interception enhancing agent 14 are affixed directly on binder 10 mainly through electrostatic forces. After melting, charged material 12 and microbiological interception enhancing agent 14 are attached, anchored, embedded, surrounded inside or outside binder 10, or any combination thereof. As an illustrative example, if an extruded carbon block is the desired result, the application of heat is performed during the extrusion process in which the enriched binder melts and disperses throughout the entire block. Concurrent with the melting of the binder material, the charged material on the binder is simultaneously dispersed and moved along with the binder. Due to the large particle size of microbiological interception enhancing agent (silver bromide), on the scale of one micrometer, and the flocculent attribute of the charged material, the binder material, charged material, and microbiological interception enhancing agent are securely held within the carbon block.

The method according to at least one embodiment of the present invention was implemented on carbon blocks and compared with control units, carbon block produced by a prior art method, such as the original formulation and methodology as taught by Koslow in the above-cited prior art U.S. patents. The control units have charged materials and microbiological interception enhancing agents both affixed directly and initially on the core filter media. In contrast, in at least one embodiment of the present invention, the charged material and microbiological interception enhancing agents are affixed initially and directly to the binder, and the enriched binder is then combined with the core filter media. Although carbon blocks and activated carbon material represent the material of choice, the present method is not restricted to only these materials and may be employed with other filter materials and other forms of the same material that similarly utilize chemical adsorption and provide a large section of surface area to allow contaminants the most possible exposure to the filter media, such as flat sheet filter media. At least one embodiment of the present invention is equally applicable to activated media in powder, particulate, and fiber form, and also equally applicable for binder material in powder, particulate, and fiber form.

Exemplary formulations are given below.

Formulation I

In one embodiment of the present invention, the binder is treated with charged material to form a composite. The charged binder is then added to the core filter media. The core filter media may be either a carbon block made from granulated or powdered activated carbon, or a flat sheet composite typically made from fibers.

The amount of charged material that is to be added to the binder material is calculated based on the type and amount of core filter media, e.g., activated carbon granules or flat sheet media, requiring treatment. The charge material may be from the polyolefin family, and more specifically a PDADMAC; however, the present invention is not limited to a particular charged material, and any of the charged material identified from the list above will work successfully with minor alteration to the quantities as can be determined by persons of ordinary skill in the art.

When the core filter media is a carbon block, charged material prepared in approximately a 40% aqueous solution is used to charge the binder in an amount 1% to 4% by weight of the core filter media, and specifically charged material at approximately 3% by weight of the core filter media is used. For charged material in its pure state, approximately 0.2% to 2% by weight of the core filter media is used to charge the binder, and specifically charged material at approximately 1% by weight of the core filter media.

The charged material in an aqueous solution is dissolved in deionized (DI) water in an amount of at least 4% by weight of the core filter media, and as an illustrative example, in an amount approximately 16%. The solution is then mixed with binder material approximately 15% to 40% by weight of the core filter media, and specifically approximately 23% by weight of the core filter media. The charged binder is dried at approximately 150° F. to 160° F. and then mixed with amorphous silicon dioxide at approximately 0.05% to 3% by weight of the core filter media, and specifically approximately 0.09% to 0.5% by weight of the core filter media, and then placed through a sieve.

For core filter media in flat sheet form, with charged material prepared in approximately a 40% aqueous solution, charge material in an amount approximately 2% to 35% by weight of the core filter media is used to charge the binder, and more specifically charged material at approximately 28% by weight of the core filter media is used. For charged material in its pure state, approximately 1.0% to 15% by weight of the core filter media in flat sheet form is used to charge the binder, and more specifically charged material at approximately 1% by weight of the core filter media.

For flat sheet media, the charged material in an aqueous solution is dissolved to between 3% and 30% by weight solution, and more specifically 25% solution with DI water. The solution is then treated onto the fiber at between 30-70% of the total weight of the binder material to be treated. The charged binder is dried at approximately 150° F. to 160° F. The binder fiber is then combined with the core filter media in a typical manner to produce the flat sheet media.

Formulation II

In another embodiment of the present invention, the binder is treated with charged material to form a composite, and the composite is then enriched with a microbiological interception enhancing agent.

In a similar manner to Formulation I, the amount of charged material that is to be added to the binder material is calculated based on the type and amount of core filter media requiring treatment. The charge material may be from the polyolefin family, and more specifically a PDADMAC; however, the present invention is not limited to a particular charged material, and any of the charged material identified from the list above will work successfully with minor alteration to the quantities as can be determined by persons of ordinary skill in the art.

For core filter media in a carbon block state, the charged material is prepared as delineated above, in approximately a 40% aqueous solution, where approximately 1% to 4% of charged material by weight of the core filter media is used to charge the binder, and more specifically charged material at approximately 3% by weight of the core filter media is used to charge the binder. For charged material in its pure state, approximately 0.2% to 2% by weight of the core filter media is used to charge the binder, and more specifically charged material at approximately 1% by weight of the core filter media.

The charged material in an aqueous solution is dissolved in deionized (DI) water in an amount of at least 4% by weight of the core filter media, and as an illustrative example, in an amount approximately 16%. The solution is then mixed with binder material approximately 15% to 40% by weight of the core filter media, and more specifically approximately 23% by weight of the core filter media. The binder is dried at approximately 150° F. to 160° F. and then mixed with amorphous silicon dioxide 0.05% to 3% by weight of the core filter media, and more specifically approximately 0.09% to 0.5% by weight of the core filter media, and then placed through a sieve.

For the addition of a microbiological interception enhancing agent to the charged binder, one method is to prepare a preparation of silver bromide powder (AgBr) from a silver nitrate solution of approximately 1.72% and a sodium bromide (NaBr) solution. The 1.72% silver nitrate solution is prepared by dissolving 34.4 g of silver nitrate in 2000 ml reverse osmosis deionized (RO/DI) water. Sodium bromide solution is prepared by dissolving 100 g of NaBr in 2000 ml of RO/DI water. The silver nitrate and the sodium bromide are combined in a container to form a yellowish precipitant, silver bromide (AgBr). The supernatant is decanted and the container is then refilled with purified water and decanted multiple times, more specifically at least three times, in order to remove substantially all of the sodium nitrate (NaNO3) from the AgBr. The AgBr is then dried at a temperature of 80° C. The dried AgBr is then ground or pulverized. The amount of silver bromide is determined based on the desirability of having at least 0.1% to 1% AgBr by weight of the core filter media will ultimately be disposed within the core filter media when the core filter media is combined with the enriched binder, and more specifically approximately 0.4% AgBr by weight of the core filter media. The dried AgBr is combined with the charged binder and the resultant enriched combination is mixed with the core filter media and heat treated.

In one embodiment, the silver bromide is mixed directly to the charged material instead of using silver nitrate and precipitating silver bromide.

As an illustrative example, extruded carbon blocks are infused with enriched binders. The carbon blocks are prepared according to the formulation of 10% to 25% charged binder, and more specifically 15% to 20% charged binder, and specifically 20% charged binder, 0% to 10% magnesium hydroxide, and more specifically 3% to 7% magnesium hydroxide, and 50% to 90% activated carbon, and more specifically 75% to 85% activated carbon. The activated carbon may be in the form of carbon powder. Silver bromide powder is dispersed in dried form to enrich the binder. The blocks are extruded while heat is applied to melt the fully enriched binder.

Carbon Blocks Prepared Via Formulation II:

Three blocks were tested for short term performance passing the MS-2 and *E. coli* tests as shown in Table IA.

TABLE IA

Short-term Microbiological Test of Carbon Block with Fully Enriched Binder

| Filter # | Total gals | End Flow Rate | End ΔP | MS2 Inf | MS2 Eff | MS2 LRV | E. Coli inf | E. Coli Eff | E. Coli LRV |
|---|---|---|---|---|---|---|---|---|---|
| 1 | 500 | 0.45 | 47.50 | 7.00E+05 | 0.0 | 5.9 | 2.90E+08 | 0.00E+00 | 8.5 |
| 2 | 468 | 0.45 | 47.10 | 7.00E+05 | 0.0 | 5.9 | 2.90E+08 | 0.00E+00 | 8.5 |
| 3 | 483 | 0.49 | 33.30 | 7.00E+05 | 0.0 | 5.9 | 2.90E+08 | 1.00E+02 | 6.5 |

As depicted in Table IB, a side-by-side comparison with a control water filter representative of the prior art formulation was conducted at a flow rate of 0.5 gpm. The control filter has charged materials with an amount of approximately 4% by weight of core filter media and microbiological interception enhancing agents, e.g. silver bromide, with an amount of 0.4% by weight of core filter media, both affixed directly and initially to the core filter media. In contrast, the test articles of this embodiment are constructed with the charged material and microbiological interception enhancing agents affixed to the binder, and the enriched binder is then combined with the core filter media.

TABLE IB

Long Term Microbiological Test of Carbon Block Prepared via Formulation II at a Flow Rate of 0.5 gpm:

| Influent pH | Effluent pH | Avg Flow Rate | End ΔP | Daily Run Gals | Challenge Gals | Total Gals | LRV MS2 | LRV E. coli |
|---|---|---|---|---|---|---|---|---|
| 6.4 | 7.3 | 0.55 | 24.3 | 60.7 | 1.1 | 61.8 | 6.0 | 9.3 |
| 6.5 | 8.6 | 0.54 | 25.0 | 53.2 | 1.2 | 116.2 | 6.0 | 9.3 |
| 6.4 | 9.1 | 0.52 | 25.8 | 51.5 | 1.1 | 168.8 | 5.5 | 9.0 |
| 6.3 | 7.3 | 0.51 | 27.3 | 50.5 | 1.2 | 220.5 | 5.8 | 9.2 |
| 6.4 | 7.3 | 0.48 | 32.4 | 46.9 | 1.1 | 268.5 | 5.4 | 8.8 |
| 6.3 | 6.9 | 0.45 | 32.6 | 44.2 | 1.2 | 313.9 | 5.3 | 7.4 |
| 6.2 | 8.2 | 0.52 | 42.7 | 50.9 | 1.1 | 365.9 | 5.9 | 9.1 |
| 6.1 | 7.0 | 0.48 | 43.3 | 47.3 | 1.1 | 414.3 | 5.0 | 7.8 |
| 6.4 | 7.3 | 0.48 | 42.8 | 47.8 | 1.1 | 463.2 | 5.9 | 9.2 |
| 6.4 | 8.8 | 0.50 | 42.5 | 49.2 | 1.1 | 513.5 | 6.0 | 9.1 |
| 6.4 | 7.1 | 0.47 | 43.3 | 46.6 | 1.1 | 561.2 | 5.5 | 9.1 |
| 6.2 | 8.1 | 0.50 | 44.0 | 48.8 | 1.2 | 611.2 | 5.4 | 9.2 |
| 6.3 | 6.6 | 0.39 | 45.9 | 38.5 | 2.3 | 652.0 | 6.1 | 9.3 |
| 5.8 | 7.0 | 0.35 | 50.1 | 34.6 | 1.1 | 687.7 | 6.0 | 9.0 |
| 5.9 | 6.7 | 0.27 | 50.9 | 27.0 | 1.0 | 715.7 | 5.9 | 9.3 |
| 5.9 | 6.9 | 0.04 | 52.4 | 4.4 | 1.0 | 721.1 | 6.0 | 9.0 |

The performance of side-by-side control filters is shown in Table IC. The carbon blocks performed with substantially the same efficacy as the control filters but at an enhanced flow rate as measured by total gallons filtered. This result was realized even though the carbon block of Formulation II was treated with a fully enriched binder that utilized less charge material and less microbiological interception enhancing agent.

TABLE IC

Control Filter (extruded carbon)

| Influent pH | Effluent pH | Avg Flow Rate | End ΔP | Daily Run Gals | Challenge Gals | Total Gals | LRV MS2 | LRV E. coli |
|---|---|---|---|---|---|---|---|---|
| 6.4 | 8.6 | 0.54 | 25.2 | 59.3 | 1.1 | 60.4 | 6.0 | 9.3 |
| 6.5 | 9.3 | 0.51 | 26.2 | 50.9 | 1.2 | 112.5 | 6.0 | 9.3 |
| 6.4 | 9.4 | 0.50 | 27.4 | 49.5 | 1.1 | 163.1 | 5.5 | 9.0 |
| 6.3 | 8.7 | 0.48 | 29.3 | 47.4 | 1.2 | 211.7 | 5.8 | 9.2 |
| 6.4 | 9.3 | 0.45 | 33.1 | 44.2 | 1.2 | 257.1 | 5.4 | 8.8 |
| 6.3 | 9.0 | 0.41 | 33.8 | 40.8 | 1.1 | 299.0 | 5.3 | 7.4 |
| 6.2 | 9.1 | 0.46 | 41.1 | 45.5 | 1.2 | 345.7 | 5.9 | 9.1 |
| 6.1 | 8.6 | 0.43 | 43.3 | 42.3 | 1.1 | 389.1 | 5.0 | 7.8 |
| 6.4 | 9.4 | 0.42 | 42.2 | 42.0 | 1.2 | 432.3 | 5.9 | 9.2 |
| 6.4 | 7.2 | 0.42 | 42.2 | 41.7 | 1.2 | 475.2 | 6.0 | 9.1 |
| 6.4 | 9.2 | 0.41 | 42.6 | 39.9 | 1.1 | 516.2 | 5.5 | 9.1 |
| 6.2 | 9.0 | 0.40 | 43.3 | 39.5 | 1.2 | 556.9 | 5.4 | 9.2 |
| 6.3 | 9.1 | 0.35 | 46.4 | 34.8 | 2.1 | 593.8 | 6.1 | 9.3 |
| 5.8 | 9.2 | 0.31 | 47.5 | 29.9 | 1.2 | 624.9 | 6.0 | 9.0 |
| 5.9 | 9.1 | 0.26 | 49.1 | 25.2 | 1.2 | 651.3 | 5.9 | 9.3 |
| 5.9 | 9.0 | 0.19 | 45.4 | 18.7 | 1.1 | 671.1 | 6.0 | 9.0 |
| 6.3 | 8.0 | 0.11 | 51.3 | 10.7 | 1.1 | 682.9 | 5.6 | 9.0 |
| 6.5 | 8.1 | 0.07 | 52.1 | 6.3 | 1.0 | 690.2 | 5.6 | 9.0 |

Formulation III

In another embodiment, both the amount of charged material and microbiological interception enhancing agent are decreased from the amounts used in Formulation II above. Additionally, the microbiological interception enhancing agent in the form of silver bromide is applied in a wet form on the binder.

In the preparation of the charged binder, the amount of charged material is decreased by approximately 10% to 50% of that utilized in Formulation II, such that in this embodiment approximately 0.05% to 2% of charged material (~40% aqueous solution) by weight of the core filter media is used, and more specifically approximately 1% is used, or if pure charged material is considered, approximately 0.1% to 1% by weight of the core filter media is used, more specifically 0.5%. The charge material may be from the polyolefin family, and more specifically a PDADMAC; however, the present invention is not limited to a particular charged material, and any of the charged material identified from the list above will work successfully with minor alteration to the quantities as can be determined by persons of ordinary skill in the art.

The charged material in an aqueous solution is dissolved in deionized (DI) water. The solution is then mixed with the wet silver bromide (AgBr). Additional deionized water is added and the combination is vigorously blended to obtain a milky solution. The solution is then mixed with 0.5 to 2 times its weight in binder material, and more specifically 1.3 times its weight in binder material. The resultant mixture is dried at approximately 150° F. to 160° F. The binder is mixed with approximately 0.1% to 0.7% amorphous silicon dioxide, ground and placed through a sieve.

Preparation of silver bromide (AgBr) powder may be prepared in a similar manner as described above, but in smaller quantity. It originally starts with 1.72% silver nitrate solution and sodium bromide (NaBr) solution. The 1.72% silver nitrate solution is prepared by dissolving 34.4 g of silver nitrate in 2000 ml RO/DI water. Sodium bromide solution is prepared by dissolving 100 g of NaBr in 2000 ml of RO/DI water. The silver nitrate and the sodium bromide are combined in a container to form a yellowish precipitant, silver bromide (AgBr). The supernatant is decanted and the container is then refilled with purified water and approximately decanted three times in order to remove substantially all of the sodium nitrate (NaNO3) from the AgBr. The AgBr is then dried. The dried AgBr is then ground or pulverized. The amount of silver bromide is determined based on the desirability of having at least 0.1% to 0.5% AgBr by weight of the core filter media in 40% solution will ultimately be disposed within the core filter media when the core filter media is combined with the charged binder, and approximately 0.2% AgBr by weight of the core filter media is disposed. The AgBr is combined with the charged binder and the resultant enriched combination is mixed with the core filter media and heat treated. In this method, the amount of AgBr by weight of core filter media is decreased by approximately 60% of the Formulation II value.

Carbon Blocks Prepared Via Formulation III:

The long term microbiological test results for the carbon blocks are shown in Table II. They have a substantially lower starting pressure drop, about 10 psi. Even after 500 gallons, the pressure drop was about 16 psi.

TABLE II

Long Term MB Test of Carbon Block Prepared via Formulation III at a Flow Rate of 0.5 gpm - Tested on an extruded carbon block

| Influent pH | Effluent pH | Avg Flow Rate | End ΔP | Daily Run Gals | Challenge Gals | Total Gals | LRV MS2 | LRV E. coli |
|---|---|---|---|---|---|---|---|---|
| 6.2 | 7.6 | 0.51 | 12.7 | 30.0 | 0 | 30.0 | 6.0 | 9.3 |
| 6.3 | 6.9 | 0.49 | 13.0 | 48.3 | 1.4 | 79.7 | 6.0 | 9.3 |
| 5.9 | 7.1 | 0.51 | 13.1 | 49.8 | 1.4 | 130.9 | 5.5 | 9.0 |
| 6.4 | 7.3 | 0.47 | 13.8 | 46.8 | 1.3 | 179.0 | 5.8 | 9.2 |
| 6.3 | 7.1 | 0.51 | 14.6 | 50.2 | 1.3 | 230.5 | 5.4 | 8.8 |
| 6.3 | 6.5 | 0.47 | 13.6 | 46.3 | 1.6 | 278.4 | 5.3 | 7.4 |
| 6.4 | 7.0 | 0.52 | 16.2 | 51.7 | 1.5 | 331.6 | 5.9 | 9.1 |
| 6.5 | 7.0 | 0.49 | 15.7 | 48.8 | 1.4 | 381.8 | 5.0 | 7.8 |
| 6.4 | 7.2 | 0.46 | 15.1 | 45.2 | 1.5 | 428.5 | 5.9 | 9.0 |
| 6.3 | 7.0 | 0.48 | 16.2 | 28.6 | 1.4 | 458.2 | 5.9 | 6.0 |
| 6.1 | 6.5 | 0.46 | 16.0 | 45.8 | 1.5 | 505.5 | 5.4 | 9.2 |
| 6.4 | 7.0 | 0.51 | 18.0 | 50.3 | 1.7 | 557.5 | 5.1 | 9.3 |
| 6.1 | 7.1 | 0.49 | 16.7 | 48.3 | 1.4 | 607.2 | 6.4 | 9.2 |
| 5.7 | 6.3 | 0.49 | 16.8 | 48.1 | 1.5 | 656.8 | 5.8 | 9.2 |
| 5.8 | 5.8 | 0.49 | 16.9 | 48.5 | 1.2 | 706.5 | 6.0 | 6.9 |
| 5.7 | 5.4 | 0.45 | 16.8 | 44.8 | 1.5 | 752.8 | 5.5 | 6.1 |
| 6.4 | 6.4 | 0.50 | 19.5 | 49.7 | 1.3 | 803.8 | 5.9 | 4.8 |
| 6.3 | 6.3 | 0.48 | 19.9 | 47.5 | 1.5 | 881.7 | 4.0 | 6.6 |

Formulation IV

In another embodiment, the formulation is the same as that of Formulation III except for two differences: 1) a coarser activated carbon powder is used; and 2) the amount of charged material added to the binder is decreased.

Preparation of the silver bromide powder is the same as delineated above. Preparation of the charged binder is as follows:

Once again, the charge material may be from the polyolefin family, and more specifically a PDADMAC; however, the present invention is not limited to a particular charged material, and any of the charged material identified from the list above will work successfully with minor alteration to the quantities as can be determined by persons of ordinary skill in the art. Charged material (~40% aqueous solution) of 0.3% to 4% by weight of the core filter media, more specifically 0.4% to 0.7%, is dissolved in an amount of at least 2% DI water by weight of the core filter media, and as an illustrative example, in 4% DI water by weight of the core filter media. The solution is then mixed with the wet silver bromide at approximately 0.1% to 0.4% by weight of the core filter media. At least 4% DI water by weight of the core filter media is added, and as an example, 12% DI water by weight of the core filter media is added, and the combination is vigorously blended to obtain a milky solution. The solution is then mixed with approximately 15% to 40% its weight in binder material, and more specifically 23% by weight of the core filter media. The mixture is dried at approximately 150° F. to 160° F. The binder is mixed with amorphous silicon dioxide, 0.03% to 0.5% by weight of the core filter media, ground and placed through a sieve.

Formulation V

This formulation is the same as the Formulation IV except polyacrylic acid (PAA) is used to facilitate the removal of microbes at lower pH, i.e., in the acidic range.

Preparation of silver bromide powder is performed in a similar manner as in Formulation IV.

In a two-step preparation, a polyacrylic acid (PAA) solution is prepared by combining a polyacrylic acid with purified water, then the PAA solution is infused with the binder material. The PAA-binder combination is then dried, crushed into powder, and then combined with charged material and microbiological interception enhancing agents.

In more detail, polyacrylic acid (PAA) in an amount approximately 0.1% to 10% PAA (35% aqueous solution) by weight of binder material, more specifically 0.4% to 0.7% PAA, is diluted in DI water in an amount of at least 2% by weight of binder material, and as an illustrative example, in an amount of 54% by weight of binder material, and mixed with the binder material. The combination is then dried at approximately 150° F. to 160° F., and roughly crushed into powder. Approximately 1% to 5% of charged material as a percentage of binder material weight, and more specifically 3% of charged material, along with 0.05% to 0.5% of the above AgBr as a percentage of the core filter media, and more specifically 0.15%, is then mixed into DI water, combined with the above binder-PAA coated powder, and dried at approximately 150° F. to 160° F. The enriched binder may then be mixed with approximately 0.1% to 0.7% by weight of binder material amorphous silicon dioxide, ground and placed through a sieve. The resultant is then combined with core filter media.

In a one-step preparation a polyacrylic acid solution is infused with binder material, a charged material solution, and a microbiological interception enhancing agent, to make an enriched binder mixture. The enriched binder mixture is then dried, mixed with core filter media to produce a filter media, and the resultant is heated.

Specifically, polyacrylic acid (PAA) in an amount approximately 0.1% to 10% PAA (35% aqueous solution) by weight of binder material is diluted in DI water in an amount at least 2% by weight of binder material, and as an illustrative example, in an amount approximately 54% by weight of binder material, and mixed with the binder material. Additionally, approximately 1% to 5% of charged material as a percentage of binder material weight, and more specifically 3% of charged material, along with 0.05% to 0.5% of AgBr as a percentage of the core filter media, and more specifically 0.15%, is then mixed into DI water, for example, in an amount 36% by weight of binder material, and combined with the above PAA coated powder, and dried at approximately 150° F. to 160° F. The enriched binder may then be mixed with approximately 0.1% to 0.7% by weight of binder material amorphous silicon dioxide, ground and placed through a sieve. The resultant product is then combined with core filter media, or may be sealed for future use.

Carbon Blocks Prepared Via Formulation IV & V:

As indicated by the following test results, all of the treated blocks passed the three microbiological reduction tests for virus and bacteria reduction. The data demonstrates that these filters outperformed the control filters. As shown in Table III, the leaching concentration of the charged material in the extraction test, as determined by the titration method, is much less than that of the control filters.

TABLE III

Charged-material (Polyolefin Family - PDADMAC) Extraction Test

| sample ID | 24 hours (ppm) | 48 hours (ppm) |
|---|---|---|
| Control filter | 38.0 | 18.4 |
| 1 | 12.3 | 0.8 |
| 2 | 0.8 | 0 |
| 3 | 0 | 0 |
| 4 | 0 | 0 |

TABLE IV

Long Term MB Test of Carbon Block Prepared via Formulation IV at a Flow Rate of 0.5 gpm - Carbon block

| Influent pH | Effluent pH | Avg Flow Rate | End ΔP | Total Gals | LRV MS2 | LRV E. coli |
|---|---|---|---|---|---|---|
| 5.90 | 9.88 | 0.51 | 20.8 | 52. | 6.32 | 9.21 |
| 5.98 | 9.34 | 0.51 | 22.7 | 102 | 6.62 | 9.03 |
| 6.08 | 9.12 | 0.51 | 24.4 | 152 | 6.89 | 9.12 |
| 5.75 | 8.81 | 0.48 | 27.3 | 202 | 6.65 | 9.26 |
| 5.57 | 9.01 | 0.47 | 30.2 | 250 | 6.71 | 9.16 |
| 5.82 | 8.89 | 0.45 | 30.8 | 297 | 6.90 | 9.39 |
| 5.86 | 9.02 |  | 36.8 | 341 | 6.57 | 9.10 |
| 5.57 |  | 0.40 | 33.4 | 382 | 7.15 | 9.48 |
| 5.59 | 9.13 | 0.38 | 44.9 | 421 | 6.80 | 9.26 |

TABLE V

Long Term MB Test of Carbon Block Prepared via Formulation V at a Flow Rate of 0.5 gpm - Carbon block

| Influent pH | Effluent pH | Avg Flow Rate | End ΔP | Total Gals | LRV MS2 | LRV E. coli |
|---|---|---|---|---|---|---|
| 5.74 | 10.07 | 0.52 | 16.8 | 52.80 | 5.90 | 8.94 |
| 5.90 | 9.22 | 0.52 | 18.2 | 105.30 | 6.32 | 9.21 |
| 5.98 | 9.15 | 0.50 | 21.2 | 156.0 | 6.62 | 9.03 |
| 6.08 | 9.15 | 0.48 | 22.8 | 204.4 | 6.89 | 9.12 |
| 5.75 | 9.36 | 0.47 | 26.2 | 251.4 | 6.65 | 9.26 |
| 5.57 | 9.15 | 0.44 | 28.2 | 296.6 | 6.71 | 9.16 |
| 5.82 | 9.08 | 0.43 | 31.3 | 340.2 | 6.90 | 9.39 |
| 5.86 | 9.07 | 0.41 | 36.1 | 381.9 | 6.57 | 9.10 |
| 5.57 | — | 0.39 | 37.4 | 422.0 | 7.15 | 9.48 |
| 5.58 | 8.95 | 0.36 | 44.3 | 458.5 | 6.80 | 9.26 |

Figure 3:
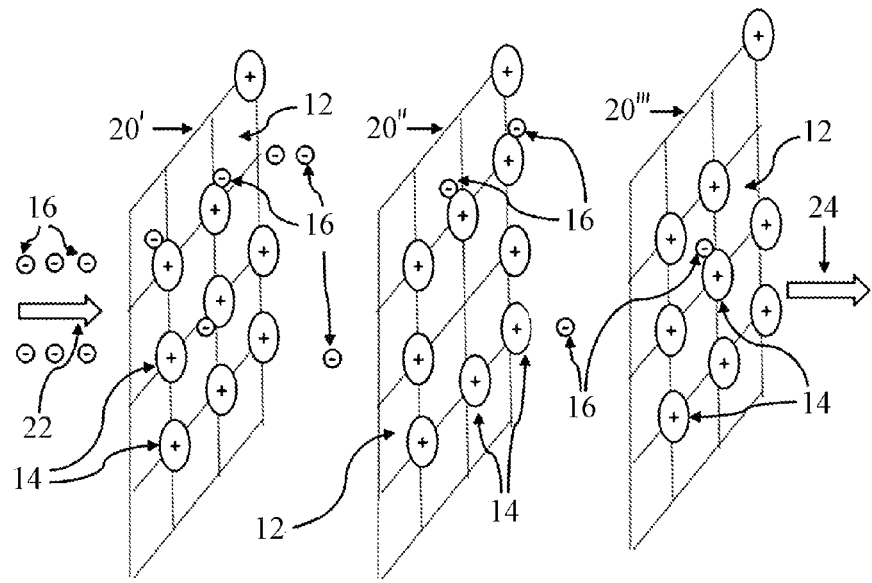
FIG. 3 is diagram showing the distribution of charged particles affixed to binder material pursuant to the present invention on various layers of carbon block and its effect on pressure drop.

Using the above-identified methodology, the initial pressure drop across a treated filter encompassing filter media is about 10 psi, which is much lower than the filters of the prior art. This is believed to be due in part because the charged material blocks the flow channel when it is coated directly on the activated carbon. Since the method according to at least one embodiment of the present invention coats the charged material directly onto the binder, the activated carbon is left intact and the initial pressure drop is reduced. The rate of increase in pressure drop is also diminished. The charged material is concentrated on the binder that is distributed within the carbon. Negatively-charged matter such as dirt, humic acid, and bacteria are attracted to the positively charged material instead of blocking the flow channel. The mechanism for this is shown in FIG. 3. The influent 22 passes through carbon filter layers 20', 20", 20''' producing effluent 24. Grid 12 represents the flow channel. Charged material 14, such as PDADMAC, on the cross will capture negatively-charged matter 16. If there is too much charged material 14 on the first layer, a significant amount of negatively-charged matter 16 will be held on the first layer and block the flow channel very quickly, while charged material 14 and the activated carbon on the second and third layers remain underutilized. The application of attaching charged material directly to the binder effectively isolates the charged material's location when the charged binder is combined with the activated carbon. By concentrating charged material 14 on an isolated region on the first layer, some negatively-charged matter may be adsorbed on the first layer and some will pass and be adsorbed on the second or third layer. Therefore, the block of the flow channel will be slower and hence the increasing of the pressure drop will be slower.

This method allows for the usage of coarser activated carbon, which also reduces the pressure drop of the filters.

The method of at least one embodiment of the present invention may be applied on other substrates such as GUR binders (high molecular weight polyethylene), inorganic fillers including silica, zeolite, and the like.

The methods described above simplify the process of depositing a microbiological interception agent within a core filter media. The methods also decrease the amount of sodium bromide, silver nitrate, and charged material, and eliminate the use of sodium chloride and ammonia in the filter making process.

Furthermore, since the ratio of carbon to binder may be on the order of 4 to 1, less material handling is necessitated since the treatment is made to the binder rather than to the activated carbon. In addition, in comparison to the prior art filters, about one-fifth to one-sixth water needed to be evaporated, thus saving thermal energy. Performance of carbon block filters is increased over the prior art since the charged material no longer reduces available surface area on the activated carbon. This also results in an increased flow rate and decreased pressure drop.

The method according to at least one embodiment allows for the utilization of a greater variety of activated carbon mesh sizes. In contrast, the prior art processes result in aggregation when applied on fine carbon, due to the high surface area of carbon and the high drying temperature. It is difficult to grind the aggregation back into fine carbon.

There was a reduction of the decomposition of the charged material due to the lower drying temperature, which was on the order of 150° F. to 160° F. in comparison with 300° F. of the prior art, which means the amount of charged material could be lowered. The existence of charged material, such as PDADMAC, at the interface between the binder and activated carbon in the block will result in a higher water flux and lower pressure drop while maintaining or even exceeding the performance of the original control formulation. Although their air values, which are used to characterize carbon block tightness, are equivalent to the control filters, their pressure drop is much lower. Four factors might contribute to this feature: 1) the swelling of the charged material enlarged the flow channel; 2) the hydrophilicity of the charged material enhanced the flow of water; 3) since the PDADMAC concentrated at certain places instead of throughout the block, bacteria or virus would be dragged to these places and inactivated there;

and 4) during the initial flushing, some charged material and/or silver bromide will be washed out and leave their unoccupied space open.

Due to the concentrating of charged material, such as PDADMAC, its amount could be further reduced. Moreover, due to the reduction of the amount of charged material and the drying temperature, the decomposition by-product could be decreased, which offers more flexibility for extrusion, e.g., higher temperatures. Additionally, the leaching of charged material can be decreased greatly, even down to, or below, the detection limit of normal titration methods. The addition of polyacrylic acid to form a polyelectrolyte complex enables the removal of microbes at lower pH, i.e., in the acidic range.

Moreover, the enriched binder may be used as a vehicle for greater control of the distribution of functional materials.

Figures 4C, 4D:
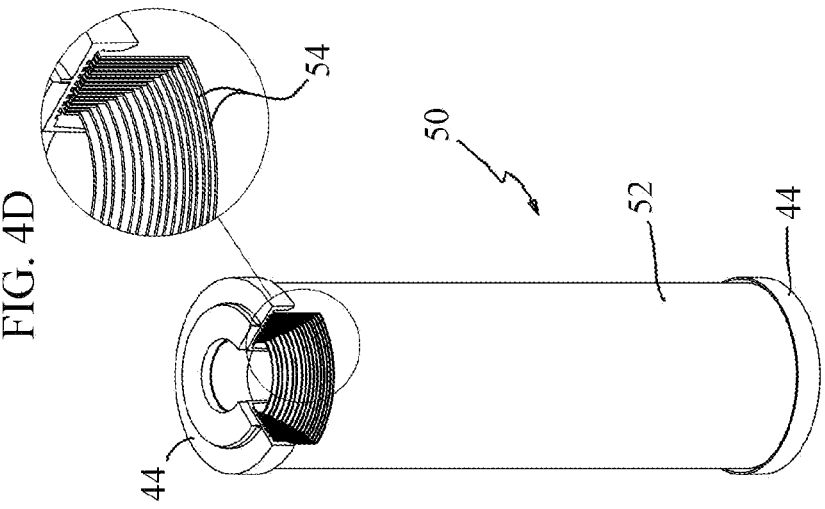
FIG. 4C is an isometric view of a filter having filter media of the present invention formed in a spiral-wound sheet.
FIG. 4D is a detail view of the filter media of FIG. 4C.
Figure 4B:
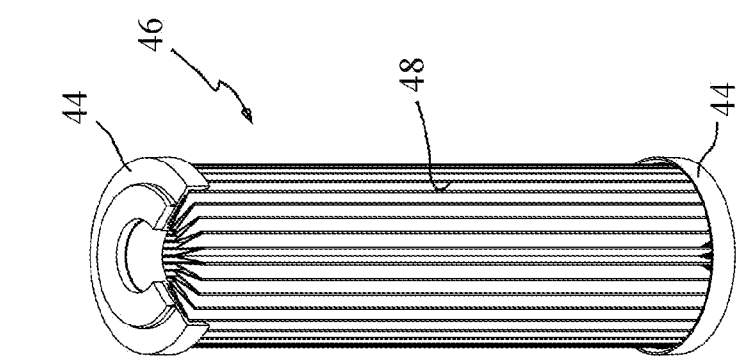
FIG. 4B is an isometric view of a filter having filter media of the present invention formed in a pleated sheet.
Figure 4A:
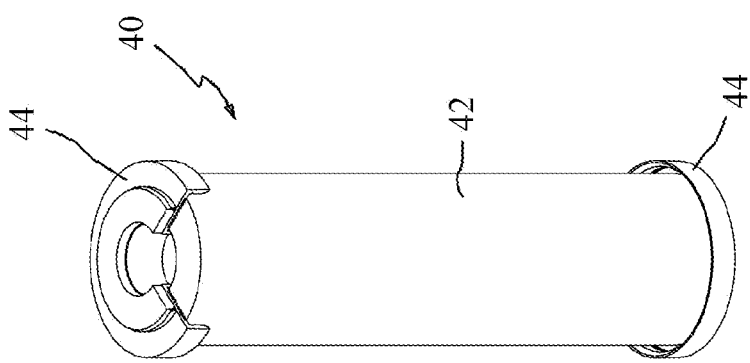
FIG. 4A is an isometric view of a filter having filter media of the present invention formed in a composite block structure.

FIGS. 4A-4D depict filters having filter media containing charged or enriched binders of the present invention. FIG. 4A is an isometric view of filter 40 having composite block filter media 42 between end caps 44. FIG. 4B depicts an isometric view of filter 46 having a filter media in the form of a pleated filter sheet 48. Fig. C is an isometric view of filter 50 having a filter media in the form of a spiral wound sheet 52. FIG. 4D is a detail of spiral wound sheet 52 depicting individual spirals 54. In each embodiment, filter media 42, 48, and 52 are fabricated using charged or enriched binders of the present invention.

During filter media fabrication, prior to the application of heat when the binder is intentionally softened, there is an intermediate stage where the filter media comprises a charged binder, which has charged material affixed directly thereto, or an enriched binder, which has charged material and microbiological interception enhancing agents affixed directly thereto, and is combined with core filter media. This intermediate combination is unique insomuch as at this is the instance in filter media manufacturing the charged material and microbiological interception enhancing agents are not purposely affixed to the core filter media.

After heat is applied to the intermediate filter media, the binder material is softened, and the charged material and microbiological interception enhancing agents are dispersed with the softened binder throughout the core filter media. This is accomplished even though the present invention teaches using less charged material and less microbiological interception enhancing agent material than previous fabrication processes. The filter media is then formed and assembled into a filter, as depicted in the isometric views of FIG. 4.

While the present invention has been particularly described, in conjunction with specific embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A method of making filter media comprising:
providing a charged material;
providing a binder material;
providing an anchoring agent solution for affixing the charged material directly to the binder material;
combining together the binder material and the anchoring agent solution thereby infusing said anchoring agent with said binder material to form a binder-anchoring agent combination;
heating the binder-anchoring agent combination to dry said binder-anchoring agent combination;
crushing the dried binder-anchoring agent combination to form a binder-anchoring agent powder;
mixing the binder-anchoring agent powder with the charged material;
heating the combined binder-anchoring agent powder and charged material in a second heating step to form a charged binder material, whereby during heating the binder melts to attach the charged material to the binder while the anchoring agent forms insoluble polyelectrolyte complexes with the charged material to enhance the attachment of the charged material to the binder thereby forming said charged binder material;
combining a core filter media with the charged binder material; and
forming a filter media with the combined core filter media and the charged binder material.

2. The method of claim 1 wherein the charged material is a cationic charged polymer.

3. The method of claim 1 wherein the charged material is selected from the group consisting of quaternized amines, quaternized amides, quaternary ammonium salts, quaternized imides, benzalkonium compounds, biguanides, cationic aminosilicon compounds, cationic cellulose derivatives, cationic starches, quaternized polyglycol amine condensates, quaternized collagen polypeptides, cationic chitin derivatives, cationic guar gum, colloids including cationic melamine-formaldehyde acid colloids, inorganic treated silica colloids, polyamide-epichlorohydrin resin, cationic acrylamides, polymers, and copolymers and combinations thereof.

4. The method of claim 1 wherein the charged material is a microbiological interception enhancing agent, said microbiological interception enhancing agent comprises an insoluble biologically active metal salt solution including biologically active metals.

5. The method of claim 1 wherein the charged material comprises a combination of a cationic material and a microbiological interception enhancing agent, such that before melting of the binder said cationic material and said microbiological interception enhancing agent are affixed directly on said binder through electrostatic forces.

6. The method of claim 5 further including the steps:
attaching the microbiological interception enhancing agent to the cationic material to form a microbiologically enhanced cationic material;
combining the microbiologically enhanced cationic material and binder-anchoring agent powder prior to the second heating step; and
in the second heating step, heating the microbiologically enhanced cationic material and binder-anchoring agent powder to form the charged binder material that is affixed to the binder material via the anchoring agent.

7. The method of claim 1 wherein the anchoring agent is polyacrylic acid (PAA).

8. The method of claim 1 wherein the combined charged material and binder-anchoring agent powder are heated to a temperature range of approximately 150° F. to 160° F. to affix the charged material directly to the binder material for forming the charged binder material.

9. The method of claim 8 wherein the anchoring agent is polyacrylic acid (PAA).

10. The method of claim 1 wherein the binder-anchoring agent powder includes both the binder material and the anchoring agent, and during the second heating step, the binder material melts to affix the charged material thereto by being embedded within the binder material while the anchoring agent forms the insoluble polyelectrolyte complexes with the charged material to increase the affixing of the embedded charged materials within the binder material.

11. The method of claim 1 wherein the binder-anchoring agent powder includes both the binder material and the anchoring agent, and during the second heating step, the binder material melts to affix the charged material thereto by being anchored to the binder material while the anchoring agent forms the insoluble polyelectrolyte complexes with the charged material to increase the anchoring of the charged materials to the binder material.

12. The method of claim 1 including:
for charged material in an aqueous solution, preparing said charged material in an amount approximately 1% to 35% by weight of said core filter media in approximately a 40% aqueous solution; or
for charged material in its pure state, preparing said charged material in an amount approximately 0.2% to 15% by weight of said core filter media.

13. The method of claim 12 including:
wherein said aqueous solution includes deionized (DI) water;
mixing and heating said charged material with said binder-anchoring agent powder to form said charged binder material; and
drying said charged binder.

14. The method of claim 13 wherein said charged material includes an insoluble microbiological interception enhancing agent comprising silver bromide.

15. A method of making filter media consisting essentially of:
providing a combination of a charged material, a binder material, and a poly acrylic acid (PAA) solution as an anchoring agent for affixing the charged material directly to the binder material;
mixing together the binder material and the PAA solution to infuse the anchoring agent with the binder material thereby forming a binder-anchoring agent combination;
drying said binder-anchoring agent combination;
providing an insoluble microbiological interception enhancing agent of silver bromide;
forming an enriched binder using said charged material, the dried binder-anchoring agent combination and the microbiological interception enhancing agent of silver bromide, whereby the anchoring agent affixes the charged material to the binder material by forming insoluble polyelectrolyte complexes with said charged material;
combining a core filter media with said enriched binder; and
forming a filter media with said core filter media and said enriched binder.

* * * * *